US009791761B1

(12) United States Patent
Li et al.

(10) Patent No.: US 9,791,761 B1
(45) Date of Patent: Oct. 17, 2017

(54) INTEGRATED CHIP

(71) Applicant: INSTITUTE OF SEMICONDUCTORS, CHINESE ACADEMY OF SCIENCES, Beijing (CN)

(72) Inventors: Ming Li, Beijing (CN); Jian Tang, Beijing (CN); Yu Liu, Beijing (CN); Haiqing Yuan, Beijing (CN); Ninghua Zhu, Beijing (CN)

(73) Assignee: INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 15/429,793

(22) Filed: Feb. 10, 2017

(30) Foreign Application Priority Data

Nov. 30, 2016 (CN) .......................... 2016 1 1088806

(51) Int. Cl.
G02F 1/035 (2006.01)
G02F 1/225 (2006.01)
G02F 1/025 (2006.01)
G02F 1/01 (2006.01)
G02F 1/21 (2006.01)

(52) U.S. Cl.
CPC ............ *G02F 1/2257* (2013.01); *G02F 1/025* (2013.01); *G02F 2001/212* (2013.01); *G02F 2201/06* (2013.01); *G02F 2201/18* (2013.01); *G02F 2201/302* (2013.01); *G02F 2203/07* (2013.01)

(58) Field of Classification Search
CPC ........ G02F 1/025; G02F 1/225; G02F 1/2252; G02F 1/2257; G02F 2203/07; G02F 2001/212; G02F 1/06; G02F 1/18; G02F 1/302; G02B 6/0288; G02B 6/268; G02B 6/2813; G02B 2006/12164
See application file for complete search history.

(56) References Cited

U.S. PATENT DOCUMENTS 8,582,933 B2 * 11/2013 Ryf .................... H04B 10/2581
385/29
8,644,714 B2 * 2/2014 Kwon .................... H01S 5/026
398/200
9,164,349 B2 * 10/2015 Hayashi ................. G02F 1/011
(Continued)

OTHER PUBLICATIONS

Thomson et al., "50-Gb/s Silicon Optical Modulator", IEEE Photonics Technology Letters, vol. 24, No. 4, Feb. 15, 2012, pp. 234-236.
(Continued)

*Primary Examiner* — Rhonda Peace
(74) *Attorney, Agent, or Firm* — Hamre, Schumann, Mueller & Larson, P.C.

(57) ABSTRACT

An integral chip is disclosed by embodiments of the present disclosure, including: two mono-mode vertical coupling gratings, two modulation modules, one 2×1 multi-mode interference coupler, and one dual-mode vertical coupling grating. The integral chip is capable of operating in dual wavelengths and dual polarization states by combination of polarization multiplexing and wavelength division multiplexing so as to realize modulation of complex formats and to enhance data modulation rate.

9 Claims, 2 Drawing Sheets

(56) References Cited

U.S. PATENT DOCUMENTS 9,344,196 B1 * 5/2016 Mashanovitch ... H04B 10/5161
2016/0094308 A1 * 3/2016 Liboiron-Ladouceur H04J 14/04
398/44

OTHER PUBLICATIONS

Liu et. al, "A high-speed silicon optical modulator based on a metal-oxide-semiconductor capacitor", Nature, vol. 427, Feb. 12, 2004, pp. 615-618.
Dong et al., "224-Gb/s PDM-16-QAM Modulator and Receiver based on Silicon Photonic Integrated Circuits", Post-Deadline Papers, 2013, 3 pages.
Sakamoto et al., "50-Gb/s 16 QAM by a quad-parallel Mach-Zehnder modulator", Post-Deadline Papers, 2008, 2 pages.
Sacher et al., "Silicon-on-Insulator Polarization Splitter-Rotator Based on TM0-TE1 Mode Conversion in a Bi-level Taper", Technical Digest, 2013, 2 pages.

\* cited by examiner

INTEGRATED CHIP

CROSS-REFERENCE TO RELATED APPLICATION

This application claims the benefit of Chinese Patent Application No. 201611088806.6 filed on Nov. 30, 2016 in the State Intellectual Property Office of China, the whole disclosure of which is incorporated herein by reference.

BACKGROUND OF THE INVENTION

Field of the Invention

Embodiments of the present disclosure relate to the technical field of electro-optical modulator, and in particular to an integrated chip.

Description of the Related Art

On one hand, a DWDM (Dense Wavelength Division Multiplexing) optical communication system in the prior art is provided with low communication rate and small capacity, intrinsically; on the other hand, an optical modulator in the prior art has large volume and high power consumption, which fact is adverse to an improvement of data forwarding ability of a central communication base station.

SUMMARY OF THE INVENTION

In order to solve at least one aspect of above problems, according to the exemplary embodiment of the present application, there is provided an integrated chip, comprising a first mono-mode vertical coupling grating, a first modulation module, a second mono-mode vertical coupling grating, a second modulation module, a 2×1 multi-mode interference coupler and a dual-mode vertical coupling grating, wherein the first mono-mode vertical coupling grating is configured to receive a laser light beam 'a' which is externally inputted and to couple the laser light beam 'a' into the first modulation module, which processes the laser light beam 'a' by a phase shift, an intensity modulation and a mode conversion sequentially before outputting such to the 2×1 multi-mode interference coupler;

the second mono-mode vertical coupling grating is configured to receive a laser light beam 'b' which is externally inputted and to couple the laser light beam 'b' into the second modulation module, which processes the laser light beam 'b' by a phase shift, an intensity modulation and a mode conversion sequentially before outputting such to the 2×1 multi-mode interference coupler; and the laser light beam 'a' and the laser light beam 'b' are two laser light beams with different wavelengths; and the 2×1 multi-mode interference coupler couples the two received laser light beams as an integral laser light beam and in turn sends the integral laser light beam into the dual-mode vertical coupling grating which couples lights of different modes simultaneously into a multi-mode optical fiber.

According to an exemplary embodiment, the first modulation module and the second modulation module are of same assembly structure and connection relationship among components thereof respectively, each of which comprises a group of following components: a 1×4 multi-mode interference coupler, two electro-optical phase shifters, four Mach-Zehnder modulators, two 2×1 multi-mode interference couplers, and a mode conversion coupler; and the components within each of the first and the second modulation modules are configured to be connected by a silicon-based transverse electric mode waveguide in which a transverse electric mode (TE0) is transmitted.

According to an exemplary embodiment, the first modulation module comprises a first 1×4 multi-mode interference coupler, a first electro-optical phase shifter, a second electro-optical phase shifter, a first Mach-Zehnder modulator, a second Mach-Zehnder modulator, a third Mach-Zehnder modulator, a fourth Mach-Zehnder modulator, a first 2×1 multi-mode interference coupler, a second 2×1 multi-mode interference coupler and a first mode conversion coupler, the first 1×4 multi-mode interference coupler is configured to receive the laser light beam outputted by the first mono-mode vertical coupling grating, and to distribute lights of a waveguide equally into four waveguides such that a laser light beam is divided in to four laser light beams;

a first laser light beam of the four laser light beams enters the first Mach-Zehnder modulator by which an electric digital signal is modulated onto an optical carrier wave of the first laser light beam which enters the first 2×1 multi-mode interference coupler;

a second laser light beam of the four laser light beams is subject to a phase shift by the first electro-optical phase shifter and then enters the second Mach-Zehnder modulator by which an electric digital signal is modulated onto an optical carrier wave of the second laser light beam which enters the first 2×1 multi-mode interference coupler;

the first 2×1 multi-mode interference coupler couples the two laser light beams of the two waveguides into a single waveguide which enters the first mode conversion coupler;

a third laser light beam of the four laser light beams enters the third Mach-Zehnder modulator by which an electric digital signal is modulated onto an optical carrier wave of the third laser light beam which enters the second 2×1 multi-mode interference coupler;

a fourth laser light beam of the four laser light beams is subject to a phase shift by the second electro-optical phase shifter and then enters the fourth Mach-Zehnder modulator by which an electric digital signal is modulated onto an optical carrier wave of the fourth laser light beam which enters the second 2×1 multi-mode interference coupler;

the second 2×1 multi-mode interference coupler couples the two laser light beams of the two waveguides into a single waveguide which enters the first mode conversion coupler;

the first mode conversion coupler couples two laser light beams of a same mode into a single waveguide, during which one of the two laser light beams is converted while the other remains unchanged; and the laser light beams outputted by the first mode conversion coupler enter the 2×1 multi-mode interference coupler.

According to an exemplary embodiment, the 1×4 multi-mode interference coupler comprises three 1×2 multi-mode interference couplers cascaded thereamong, through a first 1×2 multi-mode interference coupler of which a laser light beam is divided into two laser light beams, one divided laser light beam entering a second 1×2 multi-mode interference coupler of the three 1×2 multi-mode interference couplers and being further divided into two laser light beams while the other divided laser light beam entering a third 1×2 multi-mode interference coupler of the three 1×2 multi-mode interference couplers and being further divided into two laser light beams similarly, such that an incoming laser light beam becomes four laser light beams through the 1×4 multi-mode interference coupler.

According to an exemplary embodiment, the electro-optical phase shifters are in the form of a doping ejected PIN structure which controls optical phase shift amount by changing bias voltage thereof.

According to an exemplary embodiment, the Mach-Zehnder modulators are in the form of a micro-ring modulator or a micro-ring enhanced Mach-Zehnder modulator.

According to an exemplary embodiment, the mode conversion coupler is configured to receive two optical signals from the two 2×1 multi-mode interference couplers connected therewith, a transverse electric mode (TE0) optical signal inputted by one optical signal remaining unchanged in mode by the mode conversion coupler and being outputted by a tail-end multi-mode waveguide as a transverse electric mode (TE0), while a transverse electric mode (TE0) optical signal inputted by the other optical signal being converted to a transverse magnetic mode (TM0) via a waveguide coupling conversion by the mode conversion coupler and being outputted by the tail-end multi-mode waveguide.

According to an exemplary embodiment, the dual-mode vertical coupling grating is a two-dimensional grating for coupling lights of two modes simultaneously into an alignment optical fiber.

According to an exemplary embodiment, wherein each of the first mono-mode vertical coupling grating and the second mono-mode vertical coupling grating is replaced with a narrow line-width laser, respectively.

DETAILED DESCRIPTION OF PREFERRED EMBODIMENTS OF THE INVENTION

The above and other purposes, technical solutions and advantages of the present disclosure will become more apparent, by describing in detail exemplary embodiments thereof with reference to the accompanying drawings.

An integrated chip is provided by an exemplary embodiment of the present disclosure, comprising two mono-mode vertical coupling gratings, two modulation modules, a 2×1 multi-mode interference coupler and a dual-mode vertical coupling grating, the two mono-mode vertical coupling gratings and the two modulation modules are connected by a silicon-based transverse electric mode (TE0) waveguide in which a transverse electric mode is transmitted. Moreover, between each of the modulation modules and the 2×1 multi-mode interference coupler, and between the 2×1 multi-mode interference coupler and the dual-mode vertical coupling grating, a multi-mode waveguide is connected, in which the transverse electric mode (TE0) and the transverse magnetic mode (TM0) are transmitted simultaneously.

A first laser light beam is coupled into the integrated chip of a silicon-based high-speed dual-carrier and dual-polarization modulator through a first mono-mode vertical coupling grating, the laser light outputted from which first mono-mode vertical coupling grating enters the first modulation module which processes the first laser light beam by a phase shift, an intensity modulation and a mode conversion sequentially. A second laser light beam is coupled into the integrated chip of the silicon-based high-speed dual-carrier and dual-polarization modulator through a second mono-mode vertical coupling grating, the laser light outputted from which second mono-mode vertical coupling grating enters the second modulation module which processes the second laser light beam by a phase shift, an intensity modulation and a mode conversion sequentially. The two laser light beams outputted from both the first modulation module and the second modulation module are interference-coupled by the 2×1 multi-mode interference coupler as an integral beam which finally enters the dual-mode vertical coupling grating. The integrated chip of the silicon-based high-speed dual-carrier and dual-polarization modulator is an operating component of dual-wavelengths which may achieve optical connection between the chip and an optical fiber by coupling grating(s). Moreover, the integrated chip is provided with a phase modulator, and a Mach-Zehnder electro-optic intensity modulator, both of which may facilitate a joint key modulation of amplitude and phase and in turn a modulation of a higher order digital signal format.

Figure 1:
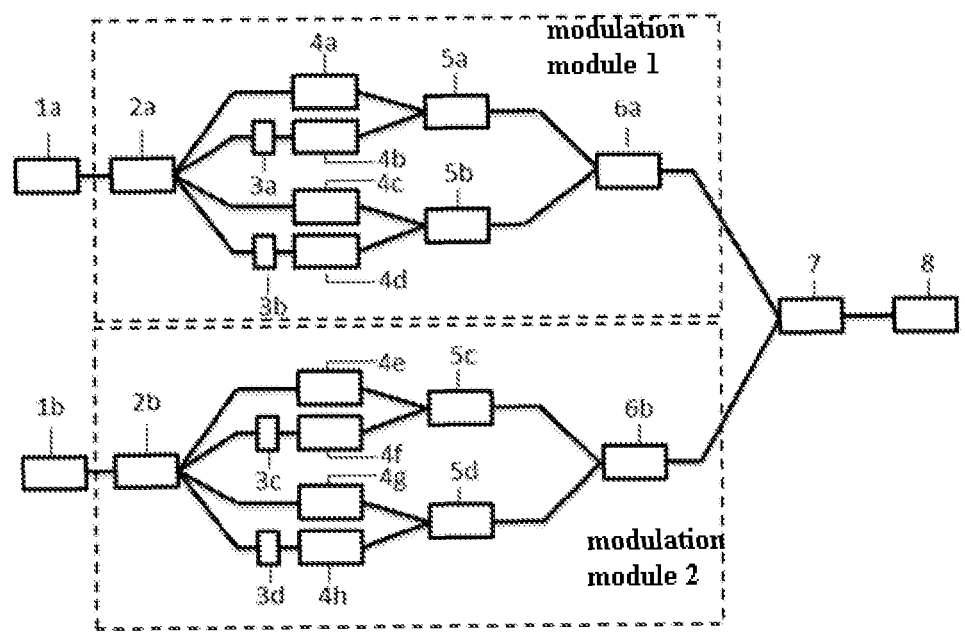
FIG. 1 illustrates a schematic structural view of an integrated chip provided by an exemplary embodiment of the disclosure.

As illustrated in FIG. 1 which illustrates a schematic structural view of the integrated chip of the silicon-based high-speed dual-carrier and dual-polarization modulator provided by the disclosure, the integrated chip comprising a first mono-mode vertical coupling grating 1a, a first modulation module 1, a second mono-mode vertical coupling grating 1b, a second modulation module 2, a 2×1 multi-mode interference coupler 7 and a dual-mode vertical coupling grating 8, wherein the first mono-mode vertical coupling grating 1a is configured to receive a laser light beam a which is externally inputted and to couple the laser light beam a into the first modulation module 1, which processes the laser light beam a by a phase shift, an intensity modulation and a mode conversion sequentially before outputting such to the 2×1 multi-mode interference coupler 7; the second mono-mode vertical coupling grating 1b is configured to receive a laser light beam b which is externally inputted and to couple the laser light beam b into the second modulation module 2, which processes the laser light beam b by a phase shift, an intensity modulation and a mode conversion sequentially before outputting such to the 2×1 multi-mode interference coupler 7; and the laser light beam a and the laser light beam b are two laser light beams with different wavelengths; and the 2×1 multi-mode interference coupler 7 couples the two received laser light beams as an integral laser light beam and in turn sends the integral laser light beam into the dual-mode vertical coupling grating 8 which couples lights of different modes simultaneously into a multi-mode optical fiber.

On the chip, the two mono-mode vertical coupling gratings, i.e., the first mono-mode vertical coupling grating 1a and the second mono-mode vertical coupling grating 1b, may be replaced with two narrow line-width lasers which are hybrid-integrated onto the modulator integrated chip, facilitating a further miniaturization of an optical transmitter module within an optical communication system.

The two modulation modules, i.e., the first modulation module 1 and the second modulation module 2, are of same assembly structure and connection relationship among components thereof respectively, each of which comprises a group of following components: a 1×4 multi-mode interference coupler, two electro-optical phase shifters, four Mach-Zehnder modulators, two 2×1 multi-mode interference couplers, and a mode conversion coupler; and the components within each of the first and the second modulation modules are configured to be connected by a silicon-based transverse electric mode waveguide in which a transverse electric mode (TE0) is transmitted.

The first modulation module 1 comprises a first 1×4 multi-mode interference coupler 2a, a first electro-optical phase shifter 3a, a second electro-optical phase shifter 3b, a first Mach-Zehnder modulator 4a, a second Mach-Zehnder modulator 4b, a third Mach-Zehnder modulator 4c, a fourth Mach-Zehnder modulator 4d, a first 2×1 multi-mode interference coupler 5a, a second 2×1 multi-mode interference coupler 5b and a first mode conversion coupler 6a.

The first 1×4 multi-mode interference coupler 2a of the first modulation module 1 is configured to receive the laser light beam a outputted by the first mono-mode vertical coupling grating 1a, and to distribute lights of a waveguide equally into four waveguides such that a laser light beam is divided in to four laser light beams; a first laser light beam of the four laser light beams enters the first Mach-Zehnder modulator 4a by which an electric digital signal is modulated onto an optical carrier wave of the first laser light beam which enters the first 2×1 multi-mode interference coupler 5a; a second laser light beam of the four laser light beams is subject to a phase shift by the first electro-optical phase shifter 3a and then enters the second Mach-Zehnder modulator 4b by which an electric digital signal is modulated onto an optical carrier wave of the second laser light beam which enters the first 2×1 multi-mode interference coupler 5a; the first 2×1 multi-mode interference coupler 5a couples the two laser light beams of the two waveguides into a single waveguide which enters the first mode conversion coupler 6a; a third laser light beam of the four laser light beams enters the third Mach-Zehnder modulator 4c by which an electric digital signal is modulated onto an optical carrier wave of the third laser light beam which enters the second 2×1 multi-mode interference coupler 5b; a fourth laser light beam of the four laser light beams is subject to a phase shift by the second electro-optical phase shifter 3b and then enters the fourth Mach-Zehnder modulator 4d by which an electric digital signal is modulated onto an optical carrier wave of the fourth laser light beam which enters the second 2×1 multi-mode interference coupler 5b; the second 2×1 multi-mode interference coupler 5b couples the two laser light beams of the two waveguides into a single waveguide which enters the first mode conversion coupler 6a; the first mode conversion coupler 6a couples two laser light beams of a same mode into a single waveguide, during which one of the two laser light beams is converted while the other remains unchanged; and the laser light beams outputted by the first mode conversion coupler 6a enter the 2×1 multi-mode interference coupler 7.

The laser light beam is processed within the second modulation module 2 in a similar manner to that of the first modulation module 1.

Figure 2:
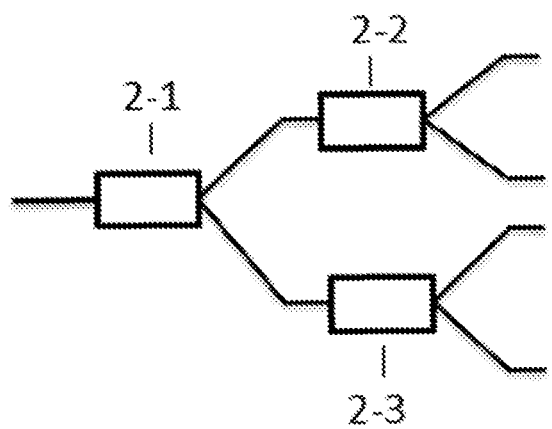
FIG. 2 illustrates a schematic structural view of a silicon-based cascaded 1×4 multi-mode interference coupler provided by an exemplary embodiment of the disclosure.

FIG. 2 illustrates a schematic structural view of the 1×4 multi-mode interference coupler within the modulation module, which 1×4 multi-mode interference coupler is formed by three 1×2 multi-mode interference couplers cascaded thereamong, with a specific operational principle thereof as illustrated in such FIG. 2, i.e., a laser light beam is divided into two laser light beams through a first 1×2 multi-mode interference coupler 2-1, one divided laser light beam entering a second 1×2 multi-mode interference coupler 2-2 of the three 1×2 multi-mode interference couplers and being further divided into two laser light beams while the other divided laser light beam entering a third 1×2 multi-mode interference coupler 2-3 of the three 1×2 multi-mode interference couplers and being further divided into two laser light beams similarly, such that an incoming laser light beam becomes four laser light beams through the 1×4 multi-mode interference coupler.

Within the two modulation modules, the electro-optical phase shifters are generally in the form of a doping ejected PIN structure for controlling optical phase shift amount by changing bias voltage thereof. During a Mach-Zehnder modulation, the modulated digital signals may become modulated in a 2ASK, 4ASK or a higher order digital signal format, and the relevant Mach-Zehnder modulator may be in the form of a micro-ring modulator or a micro-ring enhanced Mach-Zehnder modulator, either of which is more suitable for a digital format modulation.

Within the two modulation modules, the mode conversion coupler is configured to receive two optical signals from the two 2×1 multi-mode interference couplers connected therewith, a transverse electric mode (TE0) optical signal inputted by one optical signal remaining unchanged in mode by the mode conversion coupler and being outputted by a tail-end multi-mode waveguide as a transverse electric mode (TE0), while a transverse electric mode (TE0) optical signal inputted by the other optical signal being converted to a transverse magnetic mode (TM0) via a waveguide coupling conversion by the mode conversion coupler and being outputted by the tail-end multi-mode waveguide.

Figure 3:
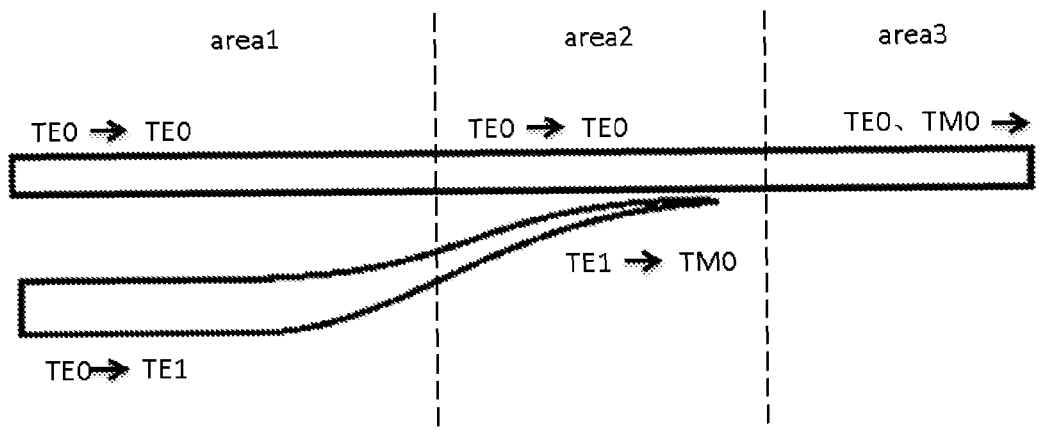
FIG. 3 illustrates a schematic structural view of a mode conversion coupler provided by an exemplary embodiment of the disclosure.

FIG. 3 illustrates a schematic view of operational principle of the mode conversion coupler within the modulation module, which may change a light field mode transmitted therein by changing waveguide's shape and coupling distance. Specific operational principle of the first mode conversion coupler 6a and the second mode conversion coupler 6b may be seen in FIG. 3. In an area 1 of FIG. 3, a transverse electric mode (TE0) signal light inputted from a lower branch is converted to a higher order transverse electric mode (TE1 mode) due to change of boundary conditions of transmission waveguide. Meanwhile, a transverse electric mode of an upper branch optical light remains unchanged. In an area 2 of FIG. 3, the waveguide of the upper branch becomes a multi-mode waveguide, and the transverse electric mode (TE0) signal light mode transmitted by the upper branch remains unchanged. When the higher order transverse mode (TE1 mode) of the lower branch is coupled into the multi-mode waveguide of the upper branch, since the multi-mode waveguide is only capable of transmitting a ground state mode, then the higher order transverse mode (TE1) is converted to a ground state transverse magnetic mode (TM0) which is in turn transmitted and coupled into the multi-mode waveguide of the upper branch. In an area 3 of FIG. 3, the transverse electric mode (TE0) and the transverse magnetic mode (TM0) are transmitted forwards collectively.

In an exemplary embodiment of the present disclosure, the dual-mode vertical coupling grating 8 may be a two-dimensional grating for coupling lights of two modes simultaneously into an alignment optical fiber.

Besides, in an exemplary embodiment of the present disclosure, each of the first mono-mode vertical coupling grating 1a and the second mono-mode vertical coupling grating 1b is replaced with a narrow line-width laser, respectively.

A workflow of the integrated chip provided by the embodiments of the disclosure is listed as below: a laser light with a wavelength of 1550.000 nm is coupled into the integrated chip of the modulator through the first vertical coupling grating 1a, with a transverse electric mode (TE0) being transmitted in an optical waveguide and divided into four branches through the first 1×4 multi-mode interference coupler 2a, two branches of which are subject to a phase modulation respectively by the first electro-optical phase shifter 3a or the second electro-optical phase shifter 3b so as to differ from the other two branches in phase by a phase difference of 90°, and then further enter the second Mach-Zehnder modulator 4b and the fourth Mach-Zehnder modulator 4d so as to be processed by an electro-optic intensity modulation therein; while the other two branches directly enter the first Mach-Zehnder modulator 4a and the third Mach-Zehnder modulator 4c so as to be processed by an electro-optic intensity modulation therein. The modulated optical signals become two branches respectively, through the first 2×1 multi-mode interference coupler 5a and the second 2×1 multi-mode interference coupler 5b; meanwhile, each of the two branches transmit an transverse electric mode (TE0) optical signal which carries a digital signal. The two branches both enter the first mode conversion coupler 6a which holds the transverse electric mode (TE0) optical signal inputted by one optical signal from the first 2×1 multi-mode interference coupler 5a unchanged and outputted by a tail-end multi-mode waveguide as a transverse electric mode (TE0); while the first mode conversion coupler 6a performs a waveguide coupling conversion on the transverse electric mode (TE0) inputted by the second 2×1 multi-mode interference coupler 5b so as to convert the latter to a transverse magnetic mode (TM0) which is then outputted by the tail-end multi-mode waveguide. As such, optical-electric fields of two modes transmitted through the tail-end multi-mode waveguide are orthogonal to each other, avoiding signal impairments caused by mutual interference (i.e. crosstalk) among optical signals carrying different data. A laser light having a wavelength of 1550.400 nm is coupled into the integrated chip of the modulator through the second vertical coupling grating 1b, and processed in a similar manner, and is coupled along with the laser light with above wavelength collectively into a multi-mode waveguide through the 2×1 multi-mode interference coupler 7, and then coupled into an optical fiber through the dual-mode vertical coupling grating 8 so as to carry out a remote transmission.

So far, the exemplary integrated chip of the embodiments of the present disclosure thus achieves operation in dual wavelengths and dual polarization states by combination of polarization multiplexing and wavelength division multiplexing so as to enhance data modulation rate. Meanwhile, the integrated chip is also capable of realizing a dual-polarization hexadecimal-system quadrature amplitude modulation.

Various embodiments of the present application have been illustrated above so as to exemplify purposes, technical solutions and beneficial technical effects of the disclosure in details It should be appreciated for those skilled in this art that the above embodiments are intended to be illustrated, and not restrictive. Although several exemplary embodiments of the general concept of the present application have been shown and described, it would be appreciated by those skilled in the art that various changes or modifications may be made in these embodiments without departing from the principles and spirit of the disclosure, the scope of which is defined in the claims and their equivalents.

What is claimed is:

1. An integrated chip, comprising a first mono-mode vertical coupling grating (1a), a first modulation module (1), a second mono-mode vertical coupling grating (1b), a second modulation module (2), a 2×1 multi-mode interference coupler (7) and a dual-mode vertical coupling grating (8),
wherein the first mono-mode vertical coupling grating (1a) is configured to receive a laser light beam (a) which is externally inputted and to couple the laser light beam (a) into the first modulation module (1), which processes the laser light beam (a) by a phase shift, an intensity modulation and a mode conversion sequentially before outputting such to the 2×1 multi-mode interference coupler (7);
wherein the second mono-mode vertical coupling grating (1b) is configured to receive a laser light beam (b) which is externally inputted and to couple the laser light beam (b) into the second modulation module (2), which processes the laser light beam (b) by a phase shift, an intensity modulation and a mode conversion sequentially before outputting such to the 2×1 multi-mode interference coupler (7); and
wherein the laser light beam (a) and the laser light beam (b) are two laser light beams with different wavelengths; and
the 2×1 multi-mode interference coupler (7) couples the two received laser light beams as an integral laser light beam and in turn sends the integral laser light beam into the dual-mode vertical coupling grating (8) which couples lights of different modes simultaneously into a multi-mode optical fiber.

2. The integrated chip according to claim 1,
wherein the first modulation module (1) and the second modulation module (2) are of same assembly structure and connection relationship among components thereof respectively, each of which comprises a group of following components: a 1×4 multi-mode interference coupler, two electro-optical phase shifters, four Mach-Zehnder modulators, two 2×1 multi-mode interference couplers, and a mode conversion coupler; and
wherein the components within each of the first and the second modulation modules are configured to be connected by a silicon-based transverse electric mode waveguide in which a transverse electric mode (TE0) is transmitted.

3. The integrated chip according to claim 2,
wherein the first modulation module (1) comprises a first 1×4 multi-mode interference coupler (2a), a first electro-optical phase shifter (3a), a second electro-optical phase shifter (3b), a first Mach-Zehnder modulator (4a), a second Mach-Zehnder modulator (4b), a third Mach-Zehnder modulator (4c), a fourth Mach-Zehnder modulator (4d), a first 2×1 multi-mode interference coupler (5a), a second 2×1 multi-mode interference coupler (5b) and a first mode conversion coupler (6a), wherein:
the first 1×4 multi-mode interference coupler (2a) is configured to receive the laser light beam (a) outputted by the first mono-mode vertical coupling grating (1a), and to distribute lights of a waveguide equally into four waveguides such that a laser light beam is divided in to four laser light beams;
a first laser light beam of the four laser light beams enters the first Mach-Zehnder modulator (4a) by which an electric digital signal is modulated onto an optical carrier wave of the first laser light beam which enters the first 2×1 multi-mode interference coupler (5a);
a second laser light beam of the four laser light beams is subject to a phase shift by the first electro-optical phase shifter (3a) and then enters the second Mach-Zehnder modulator (4b) by which an electric digital signal is modulated onto an optical carrier wave of the second laser light beam which enters the first 2×1 multi-mode interference coupler (5a);

the first 2×1 multi-mode interference coupler (5*a*) couples the two laser light beams of the two waveguides into a single waveguide which enters the first mode conversion coupler (6*a*);

a third laser light beam of the four laser light beams enters the third Mach-Zehnder modulator (4*c*) by which an electric digital signal is modulated onto an optical carrier wave of the third laser light beam which enters the second 2×1 multi-mode interference coupler (5*b*);

a fourth laser light beam of the four laser light beams is subject to a phase shift by the second electro-optical phase shifter (3*b*) and then enters the fourth Mach-Zehnder modulator (4*d*) by which an electric digital signal is modulated onto an optical carrier wave of the fourth laser light beam which enters the second 2×1 multi-mode interference coupler (5*b*);

the second 2×1 multi-mode interference coupler (5*b*) couples the two laser light beams of the two waveguides into a single waveguide which enters the first mode conversion coupler (6*a*);

the first mode conversion coupler (6*a*) couples two laser light beams of a same mode into a single waveguide, during which one of the two laser light beams is converted while the other remains unchanged; and the laser light beams outputted by the first mode conversion coupler (6*a*) enter the 2×1 multi-mode interference coupler (7).

4. The integrated chip according to claim 2,
wherein the 1×4 multi-mode interference coupler comprises three 1×2 multi-mode interference couplers cascaded thereamong, through a first 1×2 multi-mode interference coupler (2-1) of which a laser light beam is divided into two laser light beams, one divided laser light beam entering a second 1×2 multi-mode interference coupler (2-2) of the three 1×2 multi-mode interference couplers and being further divided into two laser light beams while the other divided laser light beam entering a third 1×2 multi-mode interference coupler (2-3) of the three 1×2 multi-mode interference couplers and being further divided into two laser light beams similarly, such that an incoming laser light beam becomes four laser light beams through the 1×4 multi-mode interference coupler.

5. The integrated chip according to claim 2,
wherein the electro-optical phase shifters are in the form of a doping ejected PIN structure which controls optical phase shift amount by changing bias voltage thereof.

6. The integrated chip according to claim 2,
wherein the Mach-Zehnder modulators are in the form of a micro-ring modulator or a micro-ring enhanced Mach-Zehnder modulator.

7. The integrated chip according to claim 2,
wherein the mode conversion coupler is configured to receive two optical signals from the two 2×1 multi-mode interference couplers connected therewith, a transverse electric mode (TE0) optical signal inputted by one optical signal remaining unchanged in mode by the mode conversion coupler and being outputted by a tail-end multi-mode waveguide as a transverse electric mode (TE0), while a transverse electric mode (TE0) optical signal inputted by the other optical signal being converted to a transverse magnetic mode (TM0) via a waveguide coupling conversion by the mode conversion coupler and being outputted by the tail-end multi-mode waveguide.

8. The integrated chip according to claim 1,
wherein the dual-mode vertical coupling grating (8) is a two-dimensional grating for coupling lights of two modes simultaneously into an alignment optical fiber.

9. The integrated chip according to claim 1,
wherein each of the first mono-mode vertical coupling grating (1*a*) and the second mono-mode vertical coupling grating (1*b*) is replaced with a narrow line-width laser, respectively.

\* \* \* \* \*